UNITED STATES PATENT OFFICE.

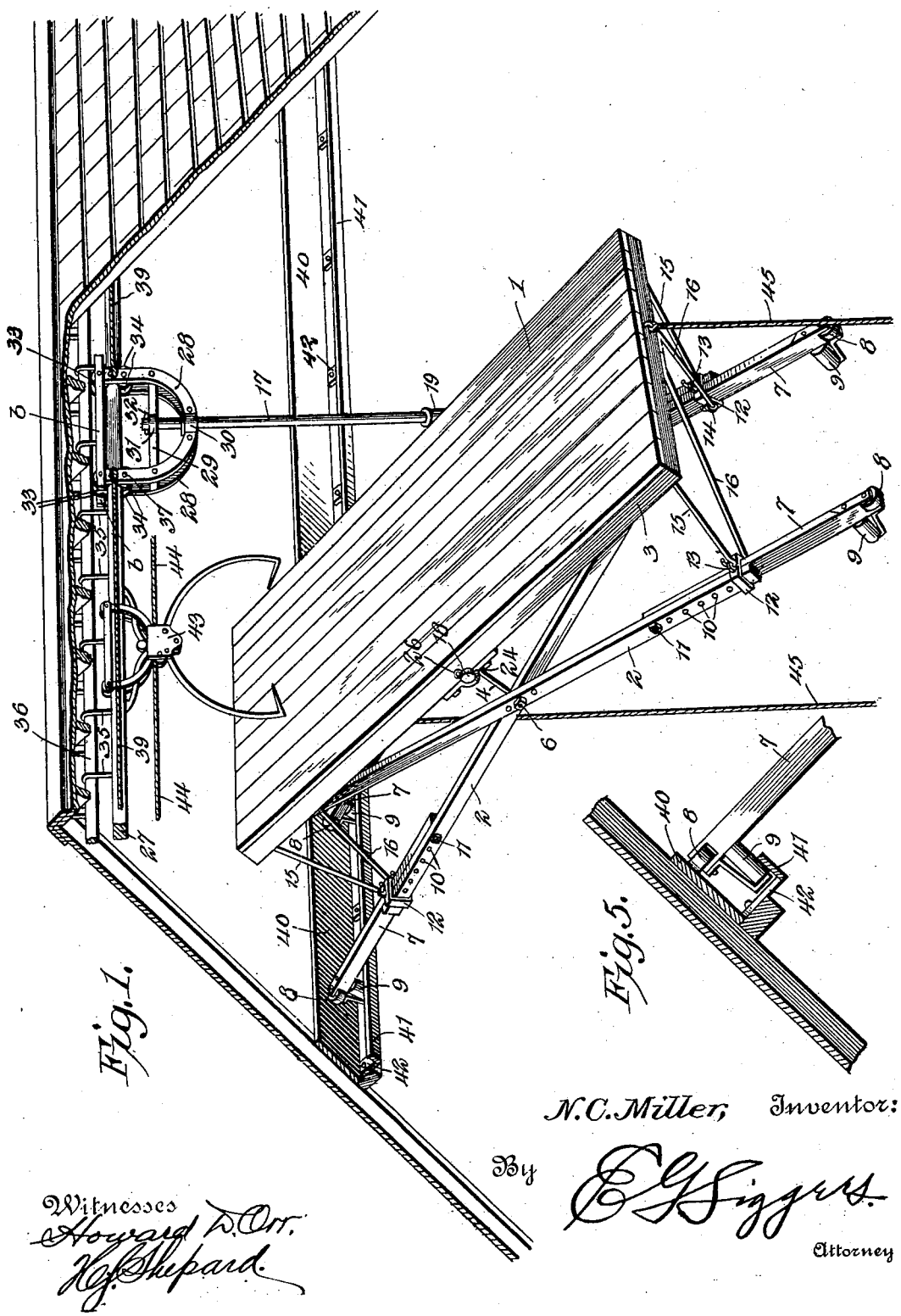

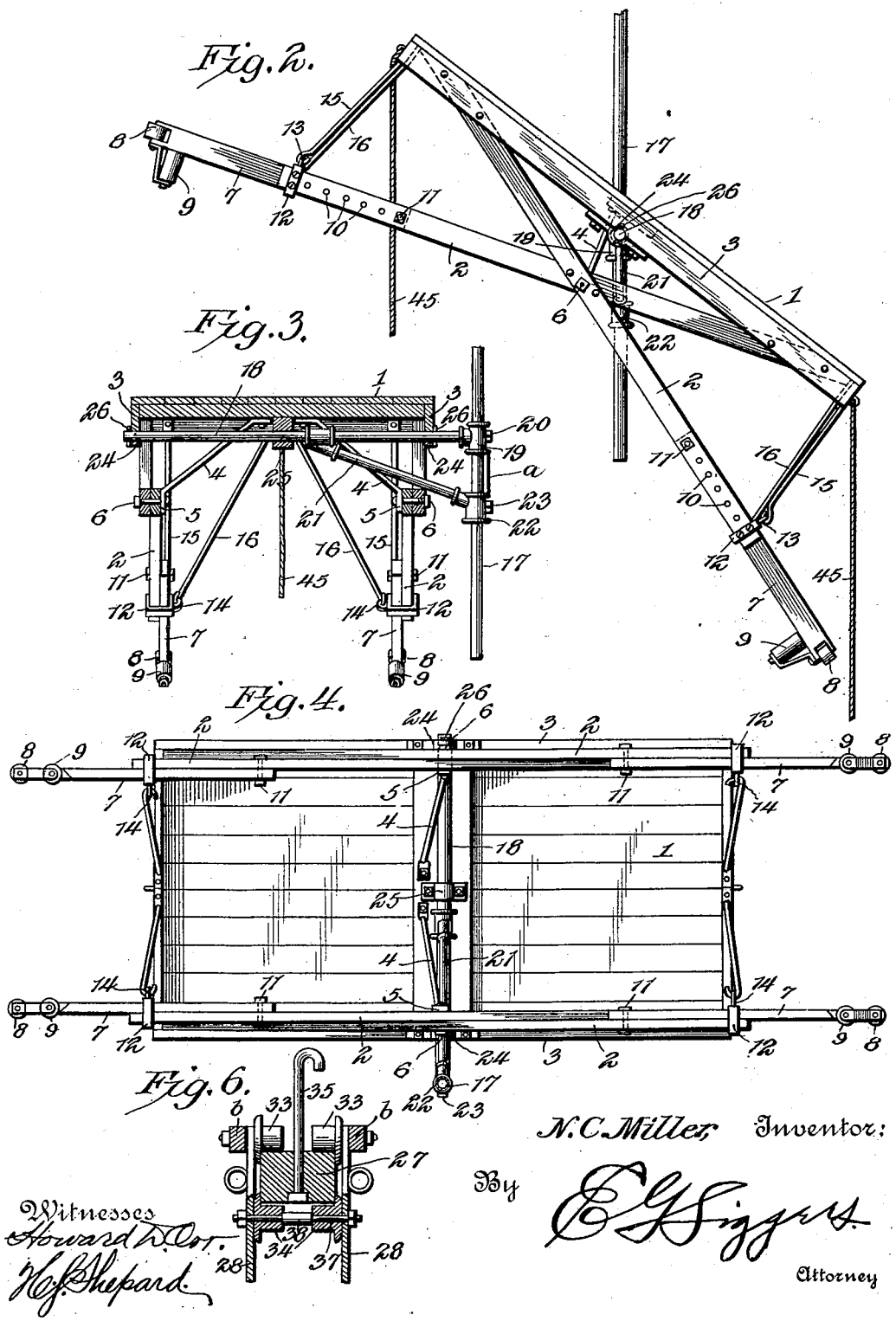

NICHOLAS C. MILLER, OF DODGEVILLE, WISCONSIN.

HAY-DISTRIBUTER.

SPECIFICATION forming part of Letters Patent No. 691,405, dated January 21, 1902.

Application filed September 16, 1901. Serial No. 75,495. (No model.)

*To all whom it may concern:*

Be it known that I, NICHOLAS C. MILLER, a citizen of the United States, residing at Dodgeville, in the county of Iowa and State of Wisconsin, have invented a new and useful Hay-Distributer, of which the following is a specification.

This invention relates to apparatus for loading straw, hay, and the like, and is designed to facilitate the storing of hay within a barn or the like, and particularly to provide for conveniently distributing the hay to the opposite sides of the barn when it is dropped or released from the grapple or hay-carrier commonly provided in barns, thereby to dispense with the services of one or more men to manually distribute the hay throughout the barn.

It is furthermore designed to provide for mounting the distributing device so that it may be conveniently shifted from end to end of the barn, so as to direct the hay to all parts thereof, and also to arrange for tilting the distributer vertically in opposite directions to alternately distribute the hay to opposite sides of the barn.

Another object resides in the provision of a slidable connection between that end of the distributer which is uppermost and the adjacent roof portion of the barn, so as to hold the distributer in an inclined position and at the same time to permit of the sidewise adjustment thereof in a direction longitudinally of the barn.

It is finally designed to arrange for vertically adjusting the distributer and also to adjust the leg-standards thereof, so as to fit the device to the particular pitch of the roofs of different barns.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of the present form of hay-distributer mounted within the top of a barn, portions of the roof thereof being broken away to illustrate the location and mounting of the distributer. Fig. 2 is a detail side elevation of the distributer. Fig. 3 is a central cross-sectional view thereof adjusted to assume a horizontal position. Fig. 4 is an inverted plan view of the distributer. Fig. 5 is a detail sectional elevation illustrating the slidable connection between the upper end of the distributer and the adjacent roof portion of the barn. Fig. 6 is a detail sectional view taken through the supporting-track and the carrier which supports the distributer.

Similar characters of reference designate corresponding parts in all the figures of the drawings.

In carrying out the present invention there is provided a chute-distributer in the nature of an elongated flat table or platform 1, which is provided at opposite sides with pairs of crossed leg-standards 2, that have their inner ends bolted or otherwise secured to the respective side beams 3 of the distributer-platform and their intermediate cross portions being connected to the outer ends of the respective brace-rods 4, that have their inner ends secured to an intermediate portion of the bottom of the distributer, as plainly illustrated in Figs. 3 and 4 of the drawings. As indicated in Fig. 3, it will be seen that each brace-rod 4 is provided with an outer terminal pendent ear 5, that lies against the inner side of the adjacent leg-standard, and a bolt 6 pierces the pair of standards and the ear 5. Each leg-standard is provided at its outer end with an endwise-adjustable section 7, which is provided with an antifriction-roller 8, journaled in a longitudinal bifurcation formed in the outer end of said section, and upon the under side of the section there is journaled another roller 9, which is located inwardly from the terminal roller and is projected substantially at right angles to the leg-standard. For adjustably connecting the standard-sections the overlapped portions thereof are provided with corresponding perforations 10 for engagement by one or more connecting-bolts 11 and there also being a band or collar 12 snugly embracing the outer end of the main leg-section 2 and the intermediate portion of the section 7. This band or collar is provided upon its upper and inner sides with the respective perforated ears 13 and 14, with which are engaged the hooked lower ends of the respective brace-rods 15 and 16, which have their upper ends connected to the under side of the distributer-platform, thereby to mutually brace the latter and the leg-standards.

For the support of the distributing-platform there is provided an upright standard 17, which is to be hung from a track in the top of the barn, as will be hereinafter described. This standard is provided with a substantially horizontal arm 18, having a transverse sleeve or T-coupling 19 provided upon its inner end and slidably embracing the standard, so as to be vertically adjustable thereon, there being a suitable set-screw 20 carried by the coupling and for engagement with the standard to interlock the arm therewith at any vertical adjustment. An inclined brace-rod 21 has its upper end connected to an intermediate portion of the arm 18 and is provided at its lower end with a T-coupling 22, slidably embracing the standard 17 and carrying a set-screw 23 for engagement with the standard. The couplings 19 and 20 are connected by a suitable brace-rod $a$, so as to stiffen and strengthen the connection between the arm 18 and upright 17. The arm 18 passes transversely across the middle bottom portion of the distributer 1, which latter is mounted to tilt thereon by means of the opposite side bearings 24 and the intermediate bearing 25, loosely embracing the arm, there being suitable stop-pins 26 piercing the arm and lying externally at opposite sides of the distributer.

In order that the distributer may be shifted from end to end of the barn, the standard 17 is hung from and mounted to travel upon a track 27, provided in the top of the barn, as indicated in Figs. 1 and 6 of the drawings. The connection between the standard 17 and the track consists of a yoke-shaped or U-shaped hanger 28, which consists of opposite duplicate members having an intermediate cross-bar 29, the upper end of the standard 17 being mounted in corresponding bearings 30 and 31, carried by the bottom portion of the hanger and the intermediate portion of the cross-bar, there being a pin 32 passed through the upper projected end of the standard, so as to form a stop for engagement with the top of the cross-bar 29, and thereby connect the standard and hanger. Upon reference to Fig. 6 of the drawings it will be seen that the corresponding upper ends of the hanger members are provided with upper and lower pairs of flanged rollers 33 and 34, respectively, which are designed to run upon the top and bottom sides, respectively, of the track 27. It will be understood that the rollers lie between the members of the hanger, and the upper rollers are separately mounted upon the respective hanger members, so as to work at opposite sides of the hooks or fastenings 35, which rise centrally from the track and are designed for connection with the beam 36 or other portion of the roof of the barn. Each lower pair of rollers is mounted upon a single journal or spindle 37, which pierces the opposite hanger members, and is provided at its center with an enlarged portion 38 to form a spacing device for supporting the rollers.

The distributer is moved in opposite directions longitudinally of the barn by means of the opposite ropes or cables 39, connected to the hanger 28 and running through suitable guides or pulleys (not shown) at each end of the barn and then carried to any point for convenience in operation.

To slidably connect those ends of the leg-standards which are uppermost, each side of the roof of the barn is provided with a broad wooden track 40, against which the adjacent rollers 8 are adapted to engage, and spaced outwardly from and substantially parallel with the former track is another track 41, which is carried by suitable brackets 42 and arranged to permit of the roller 9 working against the upper or inner face thereof, whereby the leg-standards are held against endwise movement when the rollers are engaged with the track.

It will of course be understood that the present device is used in connection with the ordinary grapple or hay-carrier commonly provided in the top of a barn and shown in Fig. 1 of the drawings at 43, said carrier being mounted to travel upon the track 27 or an independent track, as may be desired, and manipulated by means of the cables 44 so as to hoist the hay above the distributer and drop it upon the same, whereby the hay is adapted to slide downwardly upon the distributer, and thus be directed to one extreme side of the barn. By alternately tilting the distributer upon the arm 18 as a center by means of the ropes 45 the hay may be directed to either side of the barn, it of course being understood that both sides of the roof are provided with the tracks 40 and 41 for engagement by the outer ends of the respective leg-standards, although only one pair of such tracks has been shown. In order that the distributer may be brought up close to each end of the barn, the standard 17 is swiveled upon the carrier 28 by means of the bearings 30 and 31, so that the distributer may be turned around to occupy a position opposite to that shown in Fig. 1.

As best illustrated in Figs. 1 and 6, it will be noted that the opposite ends of each hanger-section 28 are connected by a cross-bar $b$, the opposite ends of which projects beyond the hanger so as to form bumpers for engagement by the hanger of the hay-carrier, thereby to protect the rollers 33 and 34 and also to limit the movement of the carrier to prevent the same being moved beyond the inclined platform 1, whereby the hanger or support for the inclined table or platform forms a stop for the hay-carrier.

From the foregoing description it is apparent that one man can conveniently manipulate the present form of hay-distributer, as the inclined table or platform is moved only at intervals, and the hay is dumped or dropped upon the table, from which it slides to the desired portion of the barn without further attention.

Having thus described my invention, what I claim as new, and desire to secure by Letters Patent, is—

1. In an apparatus for storing hay and the like, the combination of an upper track, lower tracks disposed at opposite sides of the upper track, and a normally inclined distributer hung from and traveling upon the upper track, and constructed to tilt vertically upon an intermediate axis, the opposite ends of the distributer being adapted for slidable engagement with the respective lower tracks.

2. In an apparatus for storing hay and the like, the combination with opposite tracks, of a normally inclined distributer located between the tracks and mounted to tilt vertically in opposite directions upon an intermediate support, the opposite ends of the distributer being constructed for slidable engagement with the respective tracks.

3. In an apparatus for storing hay and the like, the combination with a track, of a hanger mounted to slide thereon, and a vertically-tilting distributer having an intermediate axis which is carried by the hanger.

4. In an apparatus for storing hay and the like, the combination with a track, of a hanger mounted to travel thereon and provided with a substantially horizontal arm, and a vertically-tilting distributer mounted intermediate of its ends upon the arm.

5. In an apparatus for storing hay and the like, the combination with a track, of a hanger mounted to travel thereon, a vertically-adjustable substantially horizontal arm carried by the hanger, and a vertically-tilting distributer mounted intermediate of its ends upon the arm.

6. In an apparatus for storing hay and the like, the combination with a track, of a carrier mounted to travel thereon, a laterally-projected arm carried by the hanger and adjustable to swing about the same, and a vertically-inclined distributer carried by the arm.

7. In an apparatus for storing hay and the like, the combination with a track, of a hanger mounted to slide thereon, a standard swiveled upon the hanger, and a vertically-inclined distributer carried by the swiveled standard.

8. In an apparatus for storing hay and the like, the combination with a vertically-inclined laterally-slidable distributer, of a pair of tracks located adjacent to the upper end of the distributer, one or more rollers carried by the upper end of the distributer and mounted to travel upon one of the tracks, and one or more laterally-projecting rollers mounted to travel upon the other track, and both sets of rollers being located between the opposite tracks to prevent endwise movement in opposite directions of the distributer.

9. In an apparatus for storing hay and the like into barns, the combination with a vertically-inclined laterally-slidable distributer, of a track mounted longitudinally of and inclined with one side of the roof of the barn, a second track located below and in front of the first-mentioned track, one or more rollers carried by the upper end of the distributer and mounted to travel upon the first-mentioned track, and one or more laterally-projected rollers to travel upon the upper side of the lower track, both sets of rollers being located between the two tracks.

10. In an apparatus for storing hay and the like, the combination with opposite tracks, of a vertically-tilting distributer mounted upon an intermediate axis, and provided with opposite pairs of crossed leg-standards, the outer ends of corresponding standards being projected beyond the adjacent end of the distributer and constructed for slidable engagement with the adjacent track.

11. In an apparatus for storing hay and the like, the combination with opposite tracks, of a traveling distributer located between the tracks and mounted to tilt vertically in opposite directions upon an intermediate axis, and provided with opposite pairs of crossed leg-standards, each of which has an outer endwise-adjustable section, the outer ends of corresponding sections being constructed for detachable slidable engagement with the adjacent track.

12. In an apparatus of the character described, the combination with an elevated track, and a hay-carrier mounted thereon, of a traveling distributer located below the track and having a hanger traveling upon said track and forming a stop to limit the movement of the hay-carrier.

13. In an apparatus of the character described, the combination with an elevated track, and a hay-carrier traveling thereon, of a distributer located below the track, and a hanger rising from one side of the distributer and mounted to travel upon the track, said hanger also forming a stop to limit the movement of the hay-carrier.

14. In an apparatus of the character described, the combination with an elevated track, and a hay-carrier traveling thereon, of a distributer located below the track, and a hanger rising from one side of the distributer and provided with wheels mounted upon the track, and also having bumpers projecting in opposite directions beyond the wheels and constructed to form stops for engagement by the hay-carrier to limit the movement thereof.

In testimony that I claim the foregoing as my own I have hereto affixed my signature in the presence of two witnesses.

NICHOLAS C. MILLER.

Witnesses:
D. H. WILLIAMS,
EDWARD ESCH.